(12) United States Patent
Sparrowe et al.

(10) Patent No.: US 7,060,774 B2
(45) Date of Patent: Jun. 13, 2006

(54) PREPOLYMER MATERIAL, POLYMER MATERIAL, IMPRINTING PROCESS AND THEIR USE

(75) Inventors: David Sparrowe, Dorset (GB); Maxim Shkunov, Southampton (GB); Iain McCulloch, Hants (GB)

(73) Assignee: Merck Patent Gesellschaft, Darmstadt (DE)

( * ) Notice: Subject to any disclaimer, the term of this patent is extended or adjusted under 35 U.S.C. 154(b) by 78 days.

(21) Appl. No.: 10/375,090

(22) Filed: Feb. 28, 2003

(65) Prior Publication Data
US 2003/0166814 A1 Sep. 4, 2003

(30) Foreign Application Priority Data
Feb. 28, 2002 (EP) .................................. 02004293

(51) Int. Cl.
*C08F 22/24* (2006.01)

(52) U.S. Cl. ..................... 526/286; 526/319; 526/318.4
(58) Field of Classification Search ................ 524/560, 524/263; 101/211; 438/778; 526/319, 318.4, 526/318.43, 286, 323; 522/15, 17
See application file for complete search history.

(56) References Cited

U.S. PATENT DOCUMENTS

| | | | | |
|---|---|---|---|---|
| 4,205,018 A | * | 5/1980 | Nagasawa et al. | .......... 525/404 |
| 4,308,212 A | * | 12/1981 | Takamizawa et al. | ......... 554/77 |
| 4,585,833 A | * | 4/1986 | Domeier | .................... 525/260 |
| 6,593,392 B1 | * | 7/2003 | Wang | ......................... 522/83 |

FOREIGN PATENT DOCUMENTS

WO         WO 9609183 A1 * 3/1996

* cited by examiner

*Primary Examiner*—David W. Wu
*Assistant Examiner*—Satya Sastri
(74) *Attorney, Agent, or Firm*—Millen, White, Zelano & Branigan, P.C.

(57) ABSTRACT

The invention relates to a prepolymer material based on monomeric, oligomeric or polymeric compounds with at least one ethylenically unsaturated (meth)acryloyl group. The problem of imperfect imprinting properties, escpecially of an unwanted adhering to the imprinting stamp or mold, is circumvented by a fluorinated organo silane surfactant as an additional component of the prepolymer material. Furthermore, the invention describes an imprinting process for the manufacture of polymer articles with relief on their surface. Better release properties of the polymer article from the stamp or mold are accomplished by applying a surfactant, comprising a fluorinated organo silane, onto the surface of the mold or stamp.

14 Claims, No Drawings

PREPOLYMER MATERIAL, POLYMER MATERIAL, IMPRINTING PROCESS AND THEIR USE

The invention relates to a prepolymer material and a polymer material obtainable by polymerization of this prepolymer material. Furthermore, the invention relates to an imprinting process for the manufacture of polymer articles with relief on their surface using at least one mold or stamp with relief on its printing surface, being structured inversely to the relief of the polymer articles. Thus, the invention also relates to polymer articles with relief on its surface obtainable by the inventive imprinting process. In addition, the invention relates to uses of the prepolymer material according to the invention for manufacture of polymer articles with relief on its surface by an imprinting process. The invention also relates to a polymer electronic device.

Polymer electronic devices, like e.g. organic light emitting diodes (OLEDs), organic field effect transistors (OFETs) and polymeric integrated circuits, are currently the object of intense research. One major advantage of polymer materials are the lower production costs compared to the conventional silicon based electronic devices, especially when a high number of pieces and/or large areas with electronic and/or optical functionalities are involved. A further advantage concerns the mechanical flexibility of such polymer based devices. Typical device structures are illustrated in the papers by C. J. Drury et al., Applied Physical Letters, 73, 1998, 108–110; Z. Bao, Advanced Materials, 12, 2000, 227–230; M. Matters et al., Optical Materials, 12, 1999, 189–197; H. Sirringhaus et al., Applied Physical Letters, 77, 2000, 406–408; Z. Bao, J. A. Rogers and H. E. Katz, J. Mater. Chem. 9, 1999, 1895–1904; Z. Bao, Y. Feng et al., Chem. Mater. 9, 1997, 1299–1301.

For polymer electronic devices to be commercially viable, a low cost, scalable manufacturing process must be developed. Typically OFETs are fabricated from many layers of organic materials and therefore many processing steps are required. Low cost processing of each layer is paramount and therefore techniques utilising stamping or printing are generally regarded as being an inexpensive substitute for conventional lithography. These techniques include, micro-contact printing, screen-printing and nano-imprinting. A promising approach for large scale, low cost fabrication of source/drain structures of a transistor is high-resolution stamping (S. Y. Chou et al., Appl. Phys. Lett. 67, 1995, 3114–3116). In this process, elastomeric stamps and molds are used to generate features as small as several 10 nm.

In general, imprinting techniques (J. A. Rogers et al., Synthetic Metals 115, 2000, 5–11) require a stamp that is immersed into a prepolymer material, which then flows into the stamp features. On removal of the stamp, the material must retain these features, and in essence, a negative image of the stamp is produced. The formation of this image can arise from simply the fixing of the liquid to the substrate by optimised interfacial energies, or a hardening of the prepolymer material as it cools from the liquid into the glassy state, or as a result of a chemical reaction, often preferred photochemical, which crosslinks either a liquid polymer resin, increasing its glass transition above room temperature, or a liquid monomer, creating a polymer with a glass transition above room temperature.

Imprinting techniques often utilise poly methyl(meth) acrylates (PMMA) as it exhibits good release properties from the stamp, and has only a small volume change (less than 0.5%) associated with large changes in temperature and pressure. This allows the material to be used in processes without loss of feature registration. However the processing involved in using PMMA is complicated by the fact that the stamp/mold needs to be heated above the glass transition temperature of PMMA (approx. 105° C.). Also as the viscosity of the polymer is high, the time required to flow into the stamp features is long, which makes the process slow.

Polydimethylsiloxane (PDMS) can also be used for imprint processing (A. Kumar and G. M. Whitesides, Appl. Phys. Lett. 63, 1993, 2002–2004). This type of material can be a liquid at room temperature, with lower viscosity than PMMA, and undergo a chemical change after filling the stamp, which solidifies and creates a permanent negative image of the stamp. One way to impart this chemical change is by a photo crosslinking process, requiring the resin to also contain a photoinitiator, and either a stamp or substrate which is transparent to light at the frequency matching the photoinitiator. However problems have been encountered with this material when small feature resolution, especially smaller than about 5 µm, is required. Often the resin will not release cleanly or easily from the stamp (see FIG. 1 of said document). During the process of imprinting, a complete release is vital otherwise imperfections will accumulate in the stamp and be reproduced during subsequent stamping steps.

J. A. Rogers et al. (Applied Physics Letters, 73, 1998, 1766–1768) employed an acrylate-based prepolymer (NOA 72 from Norland Products, Inc.) among other prepolymers for the manufacture of a distributed feedback (DFB) resonator. Compared to PDMS this material releases more effectively from silica stamps. It forms smoother surfaces, and has little shrinkage. The release power of this material however is still not enough to produce multiple identical imprints.

It is an aim of this invention to provide a prepolymer material which eliminates the problem of imperfect imprinting and unwanted adhering to the imprint stamp or mold.

A further aim of this invention is to provide an imprinting process for the manufacture of polymer articles with relief on their surface using at least one mold or stamp with relief on its printing surface, being structured inversely to the relief of the polymer articles, which eliminates the problem of imperfect imprinting and unwanted adhering to the stamp or mold.

Furthermore it is an aim of this invention to present a use of the inventive prepolymer material and to provide a polymer material obtainable from this prepolymer material.

Furthermore, it is an aim of this invention to provide polymer articles with relief on their surface and polymer electronic devices, which are obtainable by imprinting processes and show essentially no imperfections on their relief surface due to unwanted adhering during the imprinting process.

Other aims of the present invention are immediately evident to the person skilled in the art from the following detailed description.

The term polymer electronic device encompasses all devices and components with electronic, preferably microelectronic, including electrooptical functionality, like e.g. resistors, diodes, transistors, integrated circuits, light emitting diodes and electrooptical displays in which at least one functionality, like e.g. conduction, semiconduction and/or light emission, is realized by a polymer and/or an organic material. Examples of such polymer electronic devices are organic light emitting diodes (OLEDs), organic field effect transistors (OFETs), and devices which contain a number of such components, like polymeric integrated circuits, e.g.

containing OFETs, and active matrices, e.g. comprising thin film transistors (TFTs), of liquid crystal displays (LCDs) and other displays.

The term imprinting process includes all techniques where at least one stamp and/or mold with relief surface is immersed into a prepolymer material, which at least partly fills the relief, which subsequently is brought from the prepolymer to a hardened polymer state and where the hardened polymer material is released from the mold or stamp. Thus the term imprinting process encompasses contact printing, including micro- and nanocontact printing, continuous reel-to-reel printing, stamping, embossing and those imprinting processes using elastomeric stamps and/or molds. Examples of these techniques are described in the documents cited in the introduction and the literature cited therein.

The term relief means at least one defined structure and/or pattern on the surface, like e.g. an edge, a step, a channel, a rib, a trench, a mesa, a grid, including their intersections and/or connections, which may be arranged in one level or two or more levels of different heights of the surface. Preferably at least one structure and/or pattern exhibits a smallest size in at least one dimension of smaller than 1 mm, preferably smaller than 100 μm, more preferably smaller than 10 μm, most preferably smaller than 1 μm.

One of the features of the present invention is a prepolymer material comprising the components A: at least one monomeric, oligomeric or polymeric compound with at least one ethylenically unsaturated (meth)acryloyl group, B: at least one crosslinking agent, C: at least one initiator for initiating the polymerization of the material under appropriate reaction conditions, and D: at least one surfactant comprising a fluorinated organo silane.

Another feature of the present invention is a polymer material obtainable by polymerization of the prepolymer material according to this invention.

A further feature of this invention is an imprinting process for the manufacture of polymer articles with relief on their surface using at least one mold or stamp with relief on its imprinting surface, being structured inversely to the relief of the polymer articles, comprising the steps a) applying at least one surfactant, comprising a fluorinated organo silane, onto the surface of the mold or stamp, such that the imprinting surface is at least partly coated with a thin film of the surfactant, b) bringing the mold or stamp into contact with a prepolymer material such that the relief of the imprinting surface of the mold or stamp is at least partly filled with the prepolymer material, c) polymerizing the prepolymer material while in contact with the mold or stamp, yielding a polymer article with relief on its surface, and d) releasing the polymer article from the mold or stamp.

An additional feature of this invention refers to a polymer article with relief on its surface obtainable by an imprinting process according to the invention.

Furthermore, a feature of this invention refers to a polymer electronic device characterized in that it comprises at least one polymer article according to the invention.

A further feature of this invention refers to a use of a prepolymer material according to the invention for the manufacture of polymer articles with relief on its surface by an imprinting process.

It has been found that the addition of at least one surfactant comprising a fluorinated organo silane (component D) to a prepolymer material comprising the components A to C according to the invention eliminates the problem of imperfect imprinting and unwanted adhering to the imprint mold and/or stamp.

Furthermore, it has also been found that the pretreatment of the imprinting mold or stamp according to the imprinting process of this invention results in a complete release of the imprinted polymer material from the mold and/or stamp.

Thus, according to both findings, in which at least one surfactant, comprising a fluorinated organo silane, is used, polymer articles having an essentially perfect relief surface can now be obtained. As no parts of the prepolymer or polymer material is left in the mold or stamp after one imprinting cycle, the mold or stamp can be used many times without carrying over imperfections from one cycle to the next. Therefore many essentially perfect imprints can be generated from a single mold or stamp. Using the inventive idea, it is now possible to employ imprinting techniques for the low cost and/or high-speed fabrication of a high number of pieces and/or large areas, in particular continuous reel-to-reel imprinting processes. Thus, the invention is an essential step for providing polymer articles with relief surface, in particular polymer electronic devices, with high reliability at low costs.

The composition of the prepolymer material, especially of the component A and B, which are preferably the major component, is chosen with regard to an optimisation of its processing properties, in particular with regard to one or more of the following requirements:

Liquid at room temperature, i.e. at about 20° C.

Viscosity low enough to allow capillary flow into the relief features of the surface of the mold and/or stamp, preferably a viscosity $\leq$500 mPas, more preferably $\leq$250 mPas. A low viscosity is preferred to achieve fast filling times of the mold or stamp.

Transparency of the prepolymer material in the wavelength range, used for photo-polymerization.

Crosslinks when exposed to UV light in the presence of a photoinitiator.

Allows short process times, most preferably without any drying or heating in curing operations required.

Shows low shrinkage, preferably less than 1%, more preferably less than 0.5%.

Transfers and retains the resolution of the relief of the mold or stamp.

Yields a highly uniform polymer material, in particular a coherent polymer film over the whole imprinting area, e.g. of a 12 inch wafer.

Gives planar and smooth surface, especially a flat surface where the mold or stamp exhibits no relief feature.

Sufficient mechanical properties of the resulting polymer material.

Preferably the component A comprises (meth)acryloyl polymerizable materials with or without copolymerizable components. The (meth) is indicating that the polymerizable materials may be methacrylic or acrylic materials. Mixtures of (meth)acryloyl and copolymerizable materials may be used. Useful materials include monomers, oligomers, polymers and copolymers of acrylic acid, methacrylic acid, acrylates, methacrylates, polyvinylacetates and polystyrenes. Preferred acrylates are alkyl acrylates and alkyl methacrylates, wherein alkyl has 1 to 12 C-atoms. Examples of preferred acrylates are methyl acrylate, ethyl acrylate and n-butyl acrylate.

Examples of preferred alkyl methacrylates are methyl methacrylate, ethyl methacrylate, n-butyl methacrylate and isobutyl methacrylate.

Preferably the component A of the prepolymer material comprises one (meth)acrylate based monomer or a blend of two or more (meth)acrylate based monomers. The (meth)acrylate based monomer is preferably a mercapto ester (meth)acrylate monomer.

Furthermore, the component A preferably comprises at least one tetrahydrofurfuryl (meth)acrylate.

Most preferably, the component A is a blend of two or more (meth)acrylate based monomers including at least one tetrahydrofurfuryl (meth)acrylate.

The crosslinking agent of component B is a multifunctional component capable of crosslinking at least one compound of component A. Preferably the component B comprises at least one poly(meth)acryloyl material with 2, 3, 4, 5, 6 or more ethylenically unsaturated (meth)acryloyl groups on a monomer. Suitable components B may include such materials as polyacrylic or polymethacrylic acid esters of polyhydric alcohols, preferably with a straight chain, branched or cyclic aliphatic group having 2 to 12 C-atoms and 2 to 6 OH-groups. Preferred poly (meth)acrylates of polyhydric alcohols are:

di(meth)acrylic acid esters of aliphatic diols such as ethyleneglycol, triethyleneglycol, 2,2-dimethyl-1,3-propanediol, 1,3-cyclopentanediol,
  tri(meth)acrylic acid esters of aliphatic triols such as glycerin, 1,2,3-propanetrimethanol, 1,2,5-pentanetriol, 1,3,6-hexanetriol,
  tetra(meth)acrylic acid esters of aliphatic tetraols such as 1,1,3,3-tetramethylolpropane and pentaerythritol, and
  the penta- and hexa-counterparts of these compounds.

The component C is at least one initiator for initiating the polymerization of the mixture under appropriate reaction conditions. Initiators for the polymerization of compounds with ethylenically unsaturated (meth)acryloyl groups are known to the person skilled in the art. In principle, the polymerization may be initiated by an initiator which sets free radicals or ions upon rising the temperature, altering the pH, exposing to electromagnetic or particle radiation or to reactive compounds. Photoinitiators, in particular being capable of producing free radicals or cations upon exposure to actinic radiation, especially UV light in the range of 315 to 400 nm, are preferred. Suitable photoinitiators include, but are not limited to photoacids such as diaryliodonium salts, triarylsulfonium salts and s-triazines. Preferred photoinitiators are free radical photoinitiators, for example acyloin and derivatives thereof, e.g. benzoin, benzoin methyl ethers, diketones, such as benzil and diacetyl, phenones such as acetophenone, 2,2,2-tribromo-1-phenylethanone, 2,2-diethoxyacetophenone, benzophenone, and the like.

The component D is at least one surfactant, comprising a fluorinated organo silane. Especially those surfactants yield very good imprinting results which have both hydrophobic and lipophobic groups.

A preferred surfactant is a fluorinated organo silane of formula I

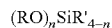 I wherein
  R, R' are independently of each other straight chain, branched or cyclic alkyl groups with 1 to 15 C-atoms, wherein one or more H-atoms may be substituted by fluorine and/or chlorine, preferably by fluorine, and wherein at least one of the four groups R, R' comprises one or more fluorine atoms and
  n is 1, 2, 3 or 4.

If R and/or R' occur twice or more in a derivative of formula I or Ia, they have identical or different meanings. Preferably at least one group of R, R' is an alkyl group as defined above, wherein at least two H-atoms are substituted by fluorine. Preferred meanings of n are 2 or 3, most preferably 3.

Preferred fluorinated organo silanes are of formula Ia

 Ia wherein
  R is a straight chain, branched or cyclic alkyl group with 1 to 6 C-atoms, and
  R' is a straight chain, branched or cyclic alkyl groups with 3 to 15 C-atoms, wherein two or more H-atoms are substituted by fluorine.

Preferably R' is a group of the formula $CF_3(CF_2)_x(CH_2)_y-$ with x and y being equal or different from 0 to 6, preferably 1, 2, 3, 4 and/or 5.

Preferred groups R are methoxy, ethoxy, n-propoxy, n-butoxy, n-pentoxy and n-hexoxy.

The concentration of the surfactant within the composition of A, B and C has to be chosen high enough in order to yield sufficient release properties from the mold or stamp. On the other hand, the concentration of the surfactant should be low enough in order to prevent phase separation from the prepolymer material, which could result in undesirable surface imperfections. The suitable amount can be calculated from the surface area of the mold and total surface areas that are involved. The lower limit is preferably 0.01 mg/m$^2$, most preferably 1 mg/m$^2$. The upper limit is preferably 1000 mg/m$^2$, most preferably 100 mg/m$^2$.

Preferred values of the lower limit of the components are:
  component A: 10% by weight, most preferably 60% by weight.
  component B: 0.1% by weight, most preferably 1% by weight.
  component C: 0.01% by weight, most preferably 0.1% by weight.
  component D: 0.001% by weight, most preferably 0.005% by weight.
  Preferred values of the upper limit of the components are:
  component A: 99.8% by weight, most preferably 99% by weight.
  component B: 90% by weight, most preferably 40% by weight.
  component C: 10% by weight, most preferably 5% by weight.
  component D: 1% by weight, most preferably 0.1% by weight.

A very preferred composition is characterized by their contents of

| component A: | 80 to 99 | % by weight, |
| --- | --- | --- |
| component B: | 1 to 20 | % by weight, |
| component C: | 0.1 to 5 | % by weight, |
| component D: | 0.005 to 0.1 | % by weight. |

It has been found that a composition of an adhesive NOA (a brand name of Norland Products Inc. of Cranbury, N.J., in particular the adhesive NOA 72, and at least one surfactant, comprising a fluorinated organo silane, that fulfills the above described requirements, including the very low adhesion properties to the mold or stamp. Thus, even relief surfaces with a smallest size in at least one dimension of smaller than 1 μm can be imprinted, leading to essentially perfect results. A preferred composition based on a NOA adhesive comprises 50 to 1000 ppm of at least one surfactant according to this invention, in particular the surfactants described as preferred in the foregoing.

According the product information of Norland Products, Inc., NOA 72 is a commercially available adhesive, which is cured by ultraviolet light between 315 and 400 nm and visible light between 400 to 450 nm. The peak absorption wavelengths are 320, 365 and 420 nm. Full cure requires 5 Joules/cm$^2$ of energy between 315 and 450 nm. NOA 72 is an optically clear, liquid adhesive, which does not require premixing, frying or heat curing, which results in a 100% solid and which is used for optical bonding applications. NOA 72 has a viscosity of 155 cps at 25° C. The cured polymer material has a refractive index of 1.56, a hardness of 75 (Shore D), a dielectric constant of 3.98 (at 1 MHz) and a volume resistivity of $7.37 \times 10^{14}$ Ωcm.

In the following preferred embodiments and variants of the imprinting process according to the invention are described.

According to step a), at least one surfactant, comprising a fluorinated organo silane, is applied onto the surface of the mold or stamp, such that at least a part of the imprinting surface is coated with a thin film of the surfactant. Preferred techniques are spin coating, spraying, vapor deposition and/or dip coating, which apply the surfactant itself or a solution containing the surfactant. The incorporation of the surfactant into a suitable solvent may reduce production costs and facilitate the processing. Suitable solvents are for example water, hydrocarbons, like toluene, ketones, like butanone or methyl ethyl ketone, and their mixtures. If a solvent is used, it is advantageously evaporated before performing step b). The surfactant is preferably applied at a temperature from 0° C. to 120° C., in particular from 15° C. to 40° C. Good imprinting results are achieved, when the surfactant is applied as a uniform thin film over the imprinting surface of the mold or stamp. The thickness of the thin film is preferably smaller than 500 nm, in particular smaller than 10 nm. Preferably the surfactant is applied onto the surface of the mold or stamp as a continuous monolayer, which may be self-assembled. It has proven as an advantage, that initially the stamp or mold is treated over a period of at least 5 min., in particular of at least 1 h and up to 24 h or even longer, to ensure complete coverage and ordering of the surfactant. Shorter treatment times can be used to restore the surfactant film or layer, i.e. when the stamp has previously been treated. After the stamp is treated with the surfactant, excess surfactant can be spun or blown off of the stamp.

Those surfactants, comprising a fluorinated organo silane, are especially suited, which are described as preferred in the foregoing. Very preferably step a) is carried out using one or more fluorinated organo silanes of formula I as defined above.

According to step b), the mold or stamp is brought into contact with a prepolymer material such that the relief of the imprinting surface of the mold or stamp is at least partly filled with the prepolymer material. Usually, the relief surface of the mold or stamp is pressed onto the prepolymer material such that the prepolymer material advantageously completely fills the relief of the imprinting surface. The imprinting depth may be as small as several micrometers or even smaller than 1 μm. Hereby applicable imprinting techniques are described in the introduction and in the definition of terms section, the cited documents and the literature cited therein.

Preferred molds or stamps are made of materials being structurizable in the micrometer and/or nanometer range by techniques known to the expert, especially in the field of microelectronics, micro- and nanotechnology, including lithographic processes, laser and electron beam writing. Those structuring techniques are preferred which yield a surface roughness being in an order of 10 times smaller than the smallest size of the relief. If photoinitiators are used, the mold or stamp, or if the prepolymer material is coated on a substrate, at least the substrate is advantageously transparent in at least a wavelength range wherein the photoinitiator is capable of starting the polymerization.

A preferred process is characterized in that a prepolymer material is used, comprising the components A: at least one monomeric, oligomeric or polymeric compound with at least one ethylenically unsaturated (meth) acryloyl group, B: at least one crosslinking agent, and C: at least one initiator for initiating the polymerization of the prepolymer material under appropriate reaction conditions.

Preferably those components A, B and/or C and their contents are used which were described as preferred in the foregoing.

Most preferably a prepolymer material according to the invention, comprising the components A, B, C and D, is used. According to this embodiment the adhesion of the polymer material to the mold or stamp is drastically decreased by the surfactant applied to the mold or stamp surface and also supported by the surfactant being the component D of the prepolymer material. But the inventive imprinting process also yields good imprinting results using prepolymer materials not comprising a surfactant according to the invention, i.e. the surfactant being already coated on the mold or stamp.

According to step c), the prepolymer material is polymerized while in contact with the mold or stamp, yielding a polymer article with relief on its surface. The polymerization process is initiated according to the chemical species of the employed initiator. Initiation by actinic radiation, in particular by UV and/or visible light, is preferred, but it may also be performed by heating of the prepolymer material. In the case of photoinitiation, the prepolymer material has to be irradiated, requiring the mold or stamp and/or a substrate, if the prepolymer is pressed against the substrate by a stamp, being transparent at least in a region of the employed wavelength range. Suitable transparent materials for the mold, stamp and/or substrate encompass silica, glass and quartz, which may be microstructured by known methods, in particular lithography and etching techniques. Curing times shorter than 10 sec, preferably shorter than 3 sec, are advantageous in view of a low cost production of a high number of articles.

According to step d), the polymer article is released from the mold or stamp. This can be accomplished by known methods, especially in the field of imprinting and molding techniques, like e.g. using ejection devices. If the formed polymer article is pressed against a substrate by a mold and/or stamp during the steps b) and c), the polymer article may also be released from the substrate, or alternatively it may be kept on the substrate, what may be advantageous for transporting the polymer article to the next fabrication step and/or the substrate may even become an integrated part of the fabricated article. It is the special advantage of this invention that the release of the polymer article from the mold and/or stamp is easily performable without that any polymer material remains in the relief surface of the mold and/or stamp. Thus, according to this invention it is in general not necessary that an additional step for cleaning the mold and/or stamp has to follow.

It is obvious to the one skilled in the art that employing the imprinting process according to this invention not only one polymer article but a number of polymer articles may be fabricated simultaneously in each process cycle, whereby continuous processes, like e.g. reel-to-reel-techniques, are most preferred.

Ideally the mold or stamp is coated only once according to the invention. But usually after a number of imprinting cycles the surfactant has to be coated again onto the mold or stamp surface due to wear and loss into the polymer material. This number of cycles, which may be between 1 and $10^6$, depends on the employed polymer material, the surfactant, the material and features of the mold or stamp and on the process parameter, like temperature, pressure, velocity etc.

The polymer article according to the invention, which is obtainable by the imprinting process described above, has preferably at least one structure and/or pattern which exhibits a smallest size in at least one dimension of smaller than 10 µm, more preferably smaller than 1 µm, most preferably equal to or smaller than 100 nm. The polymer article is preferably based on a polymer material obtainable by polymerization of a prepolymer material comprising at least the components A, B and C according to this invention. It may comprise other structured or non-structured parts of the same or different materials.

The prepolymer material as well as the imprinting process according to the invention is advantageously useful for the manufacture of polymer electronic devices and their components. Examples are thin film transistors, OFETs, OLEDs, large area driving circuits for displays, in particular LCDs, photovoltaic applications and low-cost memory devices, such as smart cards, electronic luggage tags, ID cards, credit cards, tickets etc. The polymer article according to this invention is used preferably as a substrate or even a dielectric, including insulator material with a relief surface, whereby the relief features possess functionalities themselves, like e.g. mechanical and/or optical functionality, and/or relief features are filled with materials possessing the desired functionality, like e.g. conductive, semiconductive, optical, photo- or electroluminescent properties.

A preferred example is an OFET or a number of OFETs, where the insulating substrate exhibits channels for the uptake of the source and drain material. The substrate has a layer thickness of about 50 to 1000 nm. The channels may be aligned partly in parallel and form an interdigital structure. The substrate is made of the inventive prepolymer material and/or by the inventive imprinting process. The imprinting process defines the channels, which are subsequently filled with a conductive material to build the source and drain structures of the OFET. Further production steps of such an OFET include coating with a semiconductor material, followed by a dielectric film. Onto the dielectric film, opposite to the semiconductive material and/or between the source and drain electrodes, a gate material is applied. The source, drain and gate materials may be electrically connected to electrodes. The whole device may be sealed in an encapsulating material. The general structure and the fabrication of OFETs is described in detail in the cited literature.

Further advantageous applications for the prepolymer material, the imprinting process and the polymer articles according to the invention are micro- and nanostructured polymer articles, like e.g. micromechanical, -electromechanical, -optical or -fluidic devices or components of these. Examples of such devices are pressure or acceleration sensors, electrical and/or optical switches or connectors, optical gratings or reflectors, microreaction components, biochips and microanalytical devices.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLES

The following examples are set forth to further illustrate the present invention and should not be construed as limiting the spirit or scope of the invention.

1. Prepolymer Material

| | Composition: |
|---|---|
| Component 1 | 99.9% by weight NOA 72 from Norland Inc. |
| Component 2 | 0.1% by weight F8261 from Degussa |

The component 2 comprises tridecafluor-1,1,2,2-tetrahydrooctyl-1-triethoxysilane and is used as the organo silane surfactant according to the invention.

The properties of this prepolymer material, consisting of the components 1 and 2 as defined above, are essentially the same as specified for the prepolymer alone. It shows a viscosity of 155 mPas at 25° C. The main difference is a lower surface energy of the cured polymer. The cured polymer material has a refractive index of 1.56, a hardness of 75 (Shore D), a dielectric constant of 3.98 (at 1 MHz) and a volume resistivity of $7.37 \times 10^{14}$ Ωcm.

2. The Stamp 2.1 Structure of the Stamp

A disc of a diameter of 2.5 cm and a thickness of 5 mm made from highly polished quartz glass is used. One surface contains a relief structure of feature size from 1 µm to 5000 µm in the two dimensions parallel to the surface, i.e. in width or length, and a feature depth of about 1 µm. The pattern can be described as a source-drain interdigitated finger structure with a channel width of about 1 µm. The area with the relief structure has a diameter of 2 cm and is positioned centrally within the stamp surface. The surface of the stamp can be structured by photolithographic or electron beam lithography techniques.

2.2 Cleaning of the Stamp Surface

The imprinting surface of the stamp is thoroughly cleaned by treating the stamp with water, acetone and iso-propanol, each consecutively for at least 10 min in an ultra sonic bath.

2.3 Pretreatment of the Stamp Surface

The stamp is treated with a sufficient volume (about 100 mg) of the surfactant F8261 so that the stamp surface is completely covered. The surfactant is left on the stamp surface for about 20 hours at about 20° C. Shorter treatment times can be used when the stamp has previously been treated. After the stamp is treated with the surfactant, excess surfactant is blown off of the stamp. At least a self assembled monolayer (SAM) of surfactant remains.

3. Imprinting Process

A clean, highly polished silicon wafer substrate is clamped horizontally and to its upper side about 100 mg of the prepolymer material as defined above is added to the centre. The stamp with the pretreated surface as described above is also clamped horizontally and is brought into close proximity to the silicon wafer forming a gap of 4 microns, which is filled with the prepolymer material by capillary action. Excess prepolymer flows to the edge of the stamp.

The prepolymer material is photopolymerized by exposure through the upper side of the quartz stamp. Light of 365 nm and 5 mW/cm² is used for a duration of 5 min.

The stamp is separated from the polymerized material and the silicon substrate. At this instant, competetive de-wetting occures where the polymer preferentially adheres to the substrate rather than the stamp. The result is that a UV-cured replica of the relief structure of the stamp is left remaining stuck to the substrate and the surfactant is left remaining as a continuous monolayer on the stamp.

The fabricated polymer article shows a relief structure corresponding to the inverted relief of the stamp. This structure is mechanically strong and level. A highly coherent polymer film is yielded, in particular a uniform layer over the whole imprinting area. A planar and smooth surface, especially a flat surface where the mold or stamp exhibits no relief feature, is obtained. Additionally, this structure can be reliably produced many times using this cycle.

The entire disclosure of all applications, patents and publications, cited herein and of corresponding EP application No. 02004293.3, filed Feb. 28, 2002, is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A prepolymer material comprising:
   a mercapto ester (meth)acrylate monomer or a blend of two or more mercapto ester (meth)acrylate monomers;
   at least one crosslinking agent;
   at least one initiator for initiating the polymerization of the material; and
   at least one surfactant comprising a fluorinated organo silane.

2. A prepolymer material according to claim 1 further comprising at least one tetrahydrofurfuryl (meth)acrylate.

3. A prepolymer material according to claim 1 wherein at least one crosslinking agent comprises 2 or more ethylenically unsaturated (meth)acryloyl groups.

4. A prepolymer material according to claim 1 wherein the surfactant is a fluorinated organo silane of formula I:

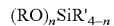  I wherein
R, R' are, independently, a straight chain, branched or cyclic alkyl group with 1–15 C-atoms, wherein one or more H-atoms are optionally substituted by fluorine and/or chlorine, and wherein at least one of the four groups R, R' comprises one or more fluorine atoms and n is 1,2,3 or 4.

5. A prepolymer material according to claim 1, comprising:

| | |
|---|---|
| 80–99 | % by weight, of the mercapto ester (meth)acrylate monomer or a blend of two or more mercapto ester (meth)acrylate monomers; |
| 1–20 | % by weight, of the at least one crosslinking agent; |
| 0.1–5 | % by weight, of the at least one initiator; and |
| 0.005–0.1 | % by weight, of the at least one surfactant. |

6. A polymer material produced by polymerizing the prepolymer material according to claim 1.

7. An imprinting process for the manufacture of a polymeric article comprising a polymer material produced by polymerizing the prepolymer material according to claim 1, and comprising a surface with a relief on said surface, the process comprising providing at least one mold or stamp comprising an imprinting surface with a relief that is structured inversely to the relief of the polymeric article, comprising:
   a) applying at least one surfactant, comprising a fluorinated organo silane, onto the imprinting surface of the mold or stamp such that said imprinting surface is at least partly coated with a thin film of the surfactant;
   b) bringing the relief of the imprinting surface of the mold or stamp that is at least partly coated with a thin film of the surfactant into contact with a material comprising
      i) a mercapto ester (meth)acrylate monomer or a blend of two or more mercapto ester (meth)acrylate monomers;
      which at least one compound comprises one mercapto ester (meth)acrylate monomer or a blend of two or more mercapto ester (meth)acrylate monomers,
      ii) at least one crosslinking agent, and
      iii) at least one initiator for initiating polymerization, such that the imprinting surface of the mold or stamp is at least partly filled with the prepolymer material according to claim 1;
   c) polymerizing the prepolymer material while in contact with the mold or stamp, yielding the polymeric article with the relief on its surface; and
   d) releasing the polymeric article from the mold or stamp.

8. An imprinting process according to claim 7 wherein the at least one crosslinking agent comprises two or more ethylenically unsaturated (meth)acryloyl groups.

9. An imprinting process according to claim 7 wherein the prepolymer material comprises:

| | |
|---|---|
| 80–99% | % by weight, of the mercapto ester (meth)acrylate monomer or a blend of two ore more mercapto ester (meth)acrylate monomers; |
| 1–20% | by weight, of the at least one crosslinking agent; |
| 0.1–5% | by weight, of the at least one initiator; and |
| 0.005–0.1% | by weight, of the at least one surfactant. |

10. An imprinting process according to claim 7 wherein the surfactant is a fluorinated organo silane of formula I:

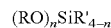  I wherein

R, R' are, independently, a straight chain, branched or cyclic alkyl group with 1–15 C-atoms, wherein one or more H-atoms optionally substituted by fluorine and/or chlorine, and wherein at least one of the four groups R, R' comprises one or more fluorine atoms and n is 1,2,3 or 4.

11. A polymeric article comprising a surface with a relief made by an imprinting process produced by polymerizing the prepolymer material according to claim 1.

12. An electronic device comprising the polymeric article according to claim 11.

13. A prepolymer material according to claim 1 wherein the at least one initiator comprises a photoinitiator.

14. A prepolymer material according to claim 1 wherein the at least one initiator comprises a diaryliodonium salt, a triarylsulfonium salt, or a s-triazine.

* * * * *

UNITED STATES PATENT AND TRADEMARK OFFICE
CERTIFICATE OF CORRECTION

PATENT NO. : 7,060,774 B2
APPLICATION NO. : 10/375090
DATED : June 13, 2006
INVENTOR(S) : Sparrowe et al.

It is certified that error appears in the above-identified patent and that said Letters Patent is hereby corrected as shown below:

Column 12, lines 37-39, read "which at least one compound comprises one mercapto ester (meth)acrylate monomer or a bland of two or more mercapto ester (meth)acrylate monomers," should be deleted Column 12, line 58, reads "two ore more" should read -- two or more --

Signed and Sealed this

Thirteenth Day of February, 2007

JON W. DUDAS
*Director of the United States Patent and Trademark Office*